(12) United States Patent
Sparks et al.

(10) Patent No.: US 8,464,571 B1
(45) Date of Patent: Jun. 18, 2013

(54) SYSTEMS AND METHODS FOR DETERMINING RESONANT FREQUENCY AND QUALITY FACTOR OF OVERDAMPED SYSTEMS

(75) Inventors: Andrew Sparks, Cambridge, MA (US); Michael Judy, Ipswich, MA (US)

(73) Assignee: Analog Devices, Inc., Norwood, MA (US)

( * ) Notice: Subject to any disclaimer, the term of this patent is extended or adjusted under 35 U.S.C. 154(b) by 544 days.

(21) Appl. No.: 12/728,867

(22) Filed: Mar. 22, 2010

Related U.S. Application Data

(60) Provisional application No. 61/161,960, filed on Mar. 20, 2009.

(51) Int. Cl.
*G01P 21/00* (2006.01)
(52) U.S. Cl.
USPC .............................. 73/1.38; 73/1.01; 702/104
(58) Field of Classification Search
USPC .................... 73/1.38, 1.01; 702/104, 107
See application file for complete search history.

(56) References Cited

U.S. PATENT DOCUMENTS

| | | | | |
|---|---|---|---|---|
| 3,113,640 A | * | 12/1963 | Stedman | 188/378 |
| 3,143,883 A | * | 8/1964 | Nakasone | 73/735 |
| 6,553,839 B2 | * | 4/2003 | Board | 73/663 |
| 6,776,042 B2 | * | 8/2004 | Pike et al. | 73/514.32 |
| 8,115,471 B2 | * | 2/2012 | Chou et al. | 324/76.11 |
| 2003/0105588 A1 | * | 6/2003 | Lin et al. | 702/1 |
| 2007/0038268 A1 | * | 2/2007 | Weinberg et al. | 607/62 |
| 2008/0086240 A1 | * | 4/2008 | Breed | 701/1 |

* cited by examiner

*Primary Examiner* — Hezron E Williams
*Assistant Examiner* — Rodney T Frank
(74) *Attorney, Agent, or Firm* — Sunstein Kann Murphy & Timbers LLP

(57) ABSTRACT

A calibration system for a MEMS system having at least one overdamped motion axis includes a measurement module for determining a location of a pole of a MEMS device in the overdamped motion axis, a closed-loop feedback system configured to change a first location of the pole to a second location of the pole, and a computation module for calculating a resonant frequency and/or a quality factor using the first and the second location of the pole as determined by the measurement module. The calibration system further includes a calibration module for calibrating the MEMS system based on the calculated resonant frequency and/or the calculated quality factor.

20 Claims, 11 Drawing Sheets

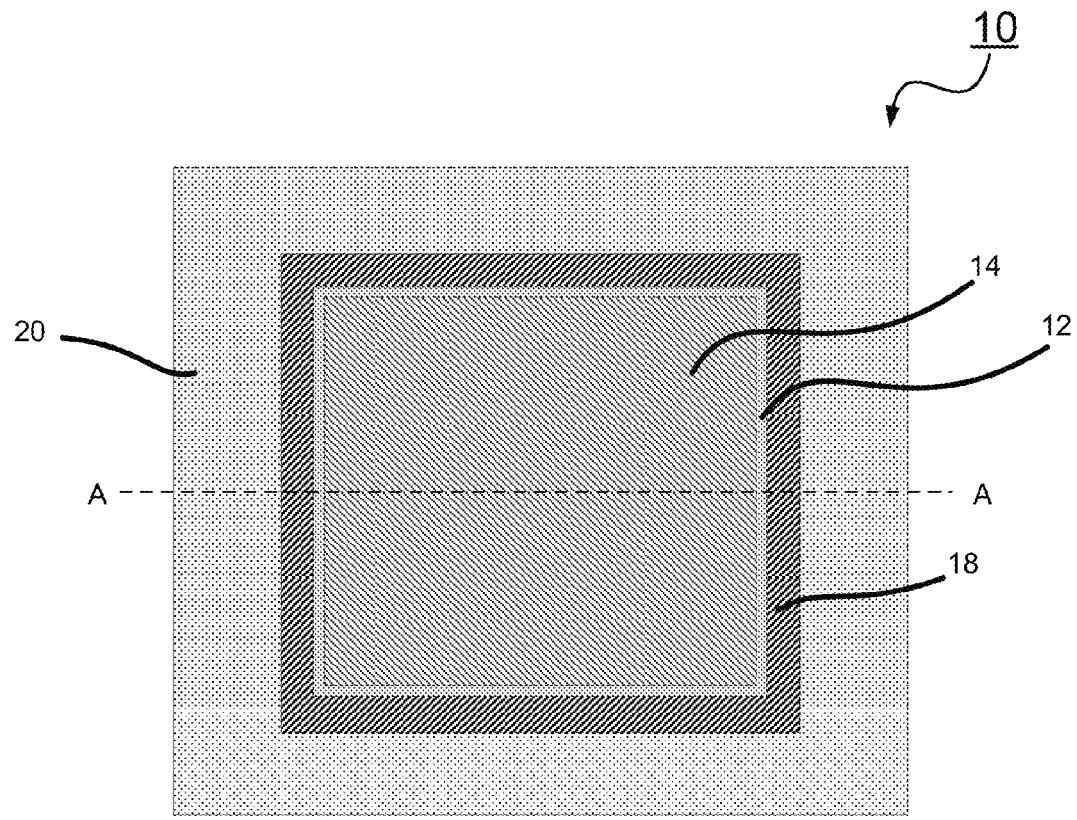
FIG. 1
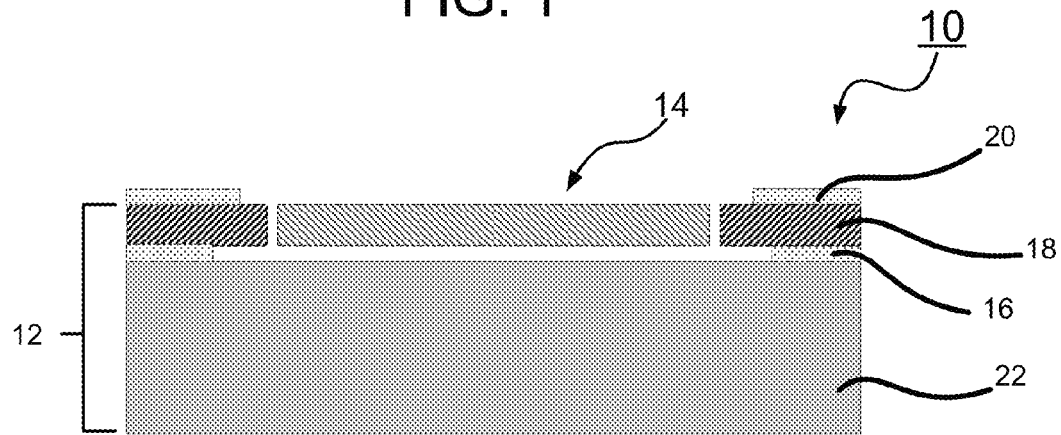
FIG. 2
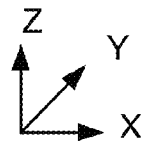

SYSTEMS AND METHODS FOR DETERMINING RESONANT FREQUENCY AND QUALITY FACTOR OF OVERDAMPED SYSTEMS

CROSS-REFERENCE TO RELATED APPLICATIONS

This patent application claims priority to U.S. Provisional Patent Application No. 61/161,960 filed Mar. 20, 2009, entitled METHODS FOR DETERMINING RESONANT FREQUENCY AND QUALITY FACTOR OF OVERDAMPED SYSTEMS, the disclosure of which is incorporated by reference herein in its entirety.

FIELD OF THE INVENTION

The invention generally relates to determining resonant frequency and quality factor in transducer systems and, more particularly, the invention relates to determining these parameters in overdamped systems.

BACKGROUND OF THE INVENTION

Transducers employing mechanical elements, particularly microelectromechanical systems (MEMS) devices, are increasingly used in different applications to detect or control the movement of an object or the presence of a substance or condition due to their relatively small size and their capability to detect relatively small amounts or changes in the measured item. MEMS devices typically employ a movable, inertial mass or flexible membrane anchored to a rigid structure. For example, in a MEMS accelerometer, the inertial mass may be suspended in a plane above a substrate (or a portion of the substrate) and movable with respect to the substrate. In one common implementation, the substrate is a single crystal silicon wafer, and the mass is created through subsequent thin film deposition, patterning, and etch steps similar to those used in conventional integrated circuit processing. Motion of the inertial mass induced by applied force or acceleration may be sensed resistively, capacitively, optically, or by other transduction mechanisms. For example, commercial capacitive MEMS accelerometers that sense translational motion in the x-, y- and z-axes may have electrodes positioned above, below and/or on opposing sides of the inertial mass to allow measurement of differential capacitance in each axis.

Resonant frequency and quality factor are two important parameters used when characterizing a MEMS transducer, or other transducer employing a mechanical element. The resonant frequency of a system is the frequency or frequencies at which the system tends to oscillate or resonate at maximum amplitude in an ideal, undamped environment. The quality factor, or Q, is a dimensionless parameter that measures the effect of a resonant system's resistance to oscillation due to damping, with a higher Q system having a lower resistance. Thus, in MEMS sensors, the resonant frequency determines the sensitivity of the device while the quality factor dictates its likelihood of colliding with part of the rigid support structure in the event of a shock. Both parameters are required to predict the time-dependent response of the mechanical element to an arbitrary external stimulus.

MEMS devices are commonly made by a sequence of thin film depositions and etches performed on a silicon substrate, e.g., a single crystal silicon wafer or a silicon-on-insulator ("SOI") wafer. Due to the nature of the MEMS fabrication processes typically used, many devices are generally overdamped in the z-axis (normal to the plane of the wafer) due to the strong squeezed-film damping effects. In overdamped systems (i.e., Q<0.5), the accurate measurement of these two parameters based on the frequency or transient response is usually difficult to make. One important consequence is that calculating the sensitivity based on electrical measurements cannot be done accurately. For MEMS accelerometers, a common alternative is to submit each MEMS device to a shake test in order to determine its sensitivity to acceleration, which entails substantial characterization costs. As known by those skilled in the art, the shake test entails physically shaking or vibrating every device at one or more predetermined frequencies and amplitudes and then measuring its voltage output. The device is then appropriately calibrated so that each sensor has approximately the same sensitivity regardless of variations in the physical components that make up the sensor.

Characterization of an underdamped second-order system (i.e., Q>0.5) is typically accomplished using a frequency sweep and measuring the peak frequency and width. This is possible because the poles in an underdamped second-order system are imaginary, resulting in a peak of the frequency response near the resonant frequency. However, for an overdamped second-order system, the two poles are real and at different frequencies. As known by those skilled in the art, poles represent frequencies where the response undergoes an abrupt transition. In MEMS transducers, it is not uncommon for the poles to span an order of magnitude of frequency or more. Thus, historically, the location of both poles needs to be measured in order to calculate the resonant frequency and Q factor of an overdamped system based on the frequency response. The measurement of the higher frequency pole, however, is difficult and costly to determine since it requires substantial dynamic range and sufficiently high bandwidth measurement circuitry.

SUMMARY OF THE INVENTION

In accordance with one embodiment of the invention, a calibration system for a MEMS system having at least one overdamped motion axis includes a measurement module for determining a location of a pole of a MEMS device in the overdamped motion axis, a closed-loop feedback system configured to change a first location of the pole to a second location of the pole, and a computation module for calculating a resonant frequency and/or a quality factor using the first and the second location of the pole as determined by the measurement module. The calibration system also includes a calibration module for calibrating the MEMS system based on the calculated resonant frequency and/or the calculated quality factor. As known in the art, a "pole location" is synonymous with the "frequency of the pole."

In accordance with another embodiment of the invention, a method of calibrating a MEMS system provides a MEMS device having at least one overdamped motion axis, determines a first location of a pole of the MEMS device in the overdamped motion axis, and changes the first location to a second location. The method also determines the second location of the pole, calculates a resonant frequency and/or a quality factor using the first and the second location of the pole, and calibrates the MEMS system based on the calculated resonant frequency and/or the calculated quality factor.

In accordance with another embodiment of the invention, a method of detecting a parameter in an overdamped system with a MEMS system provides a MEMS device having at least one overdamped motion axis, determines a first location of a pole of the MEMS device in the overdamped motion axis, and measures a change in the first location to a second location of the pole. The method also calculates a resonant frequency and/or a quality factor using the first and the second location of the pole, and determines the parameter based on the calculated resonant frequency and/or the calculated quality factor.

In some embodiments, the calibration system's closed-loop feedback system may be configured to regulate any mechanical characteristic of the device, e.g., position and/or velocity. The closed-loop feedback system may be a positive feedback system and/or a negative feedback system. The MEMS device may be a MEMS sensor, such as an accelerometer. The first location of the pole may be determined by performing a localized frequency sweep. Changing the first location may be accomplished by a closed-loop feedback system. The method may further include changing an initial location of the pole to the first location before determining the first location of the pole. Changing the initial location may be accomplished by a closed-loop feedback system. The MEMS device has two poles, one having a higher frequency and one having a lower frequency, and the first location and the second location may be determined for the lower frequency pole. The method may further include providing a closed-loop feedback system in the MEMS system to change the first location to the second location.

BRIEF DESCRIPTION OF THE DRAWINGS

The foregoing features of various embodiments of the invention will be more readily understood by reference to the following detailed description, taken with reference to the accompanying drawings, in which:

FIG. 1 schematically shows a plan view of a MEMS sensor that may be characterized according to illustrative embodiments of the present invention;

FIG. 2 schematically shows a cross-sectional view of a MEMS sensor along line A-A of FIG. 1;

DESCRIPTION OF ILLUSTRATIVE EMBODIMENTS

Figure 3:
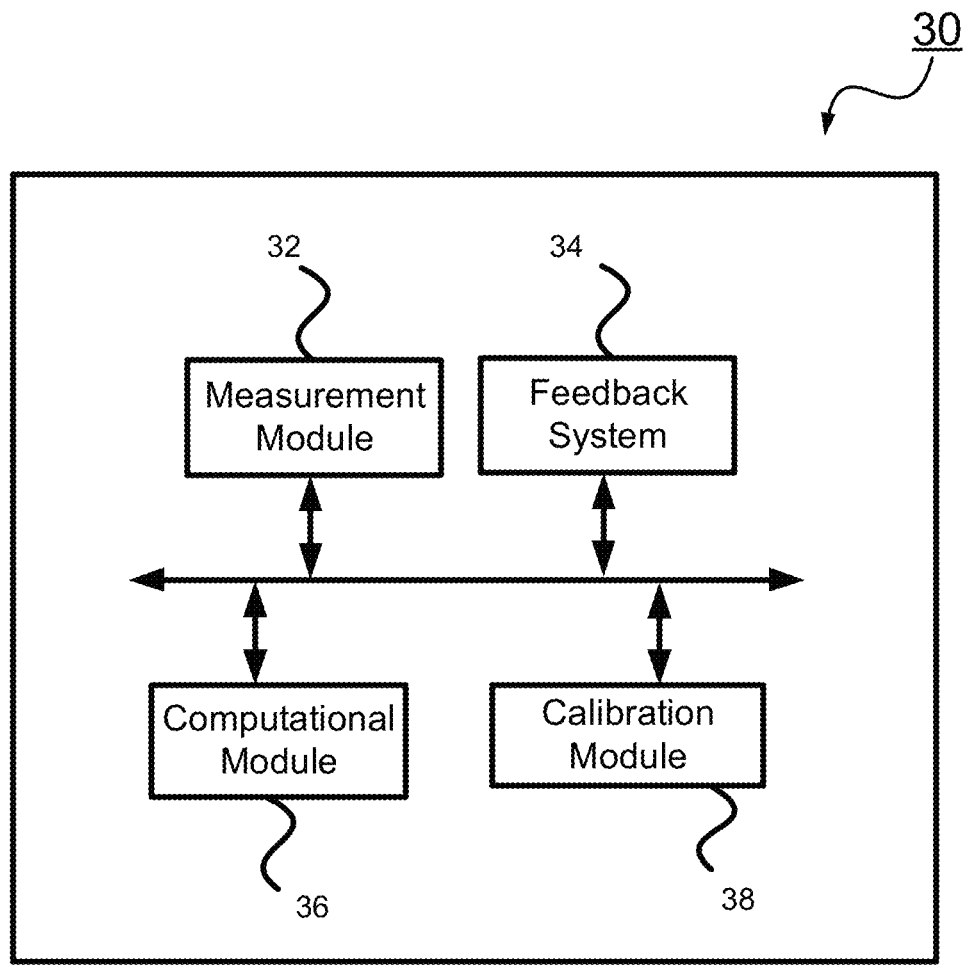
FIG. 3 shows a calibration system for a MEMS device according to embodiments of the present invention.

Various embodiments of the present invention provide systems and methods for calibrating MEMS systems using a feedback system and measurement technique to calculate the resonant frequency and quality factor of a MEMS device. The measurement technique allows the resonant frequency and quality factor to be determined independently of one another in an overdamped second-order mechanical sensor system. The measurement technique may be performed by taking two or more measurements of sensor motion at a predetermined frequency or frequencies, preferably at least one with and without feedback or at least two with feedback. The calculated resonant frequency and quality factor may then used to calibrate the MEMS system. In some embodiments, the calculated resonant frequency and quality factor may be used to detect a parameter, such as pressure, temperature, viscosity, density, etc., in an overdamped system. Details of illustrative embodiments are discussed below.

FIGS. 1 and 2 schematically show a plan view and a cross-sectional view, respectively, of a MEMS sensor 10 that may be characterized and calibrated according to illustrative embodiments of the present invention. The figures are not drawn to scale and do not show all the details of the sensor. The MEMS sensor 10 includes a substrate 12 having a MEMS structure 14 formed thereon. The substrate 12 may be formed from a silicon wafer or an SOI wafer, for example. As known by those in the art, one or more layers may be formed on the surface of the substrate 12 and the MEMS structure 14 may be formed on top of the substrate 12 (in the case of a silicon wafer) or in the top layer of the substrate 12 (in the case of an SOI wafer). The layers may include one or more layers of materials typically used in the manufacture of a MEMS device, such as an oxide layer, a polysilicon layer, a nitride layer, etc. The various layers may be masked off or patterned using processes well known to those skilled in the art, e.g., using photolithography and etching techniques.

For simplicity, FIGS. 1 and 2 are, further described using an SOI wafer, which has an insulator layer 16 (e.g., an oxide) between two silicon layers 18. The MEMS structure 14 includes a movable mass with movable structures connected by springs to non-moving structures (details not shown). The MEMS structure 14 is formed in the top silicon layer 18 of the substrate 12 and suspended above the bottom silicon layer 22. The movable mass and structures are movable with respect to the bottom silicon layer 22 of the substrate 12, e.g., in the x-, y-, and z-axes. The movable structures along with the non-moving structures may be secured to the substrate 12 in one or more areas, as known by those skilled in the art.

The MEMS sensor 10 may also have an electrode (not shown) formed above, below and/or adjacent to the movable structures that may be used when measuring the movement of the movable mass in a particular direction or directions. In some embodiments, a dielectric layer 20 may be formed on the top silicon layer 18 of the substrate 12 to electrically isolate the MEMS structure 14 from subsequent layers or structures attached to the substrate 12.

Figure 4:
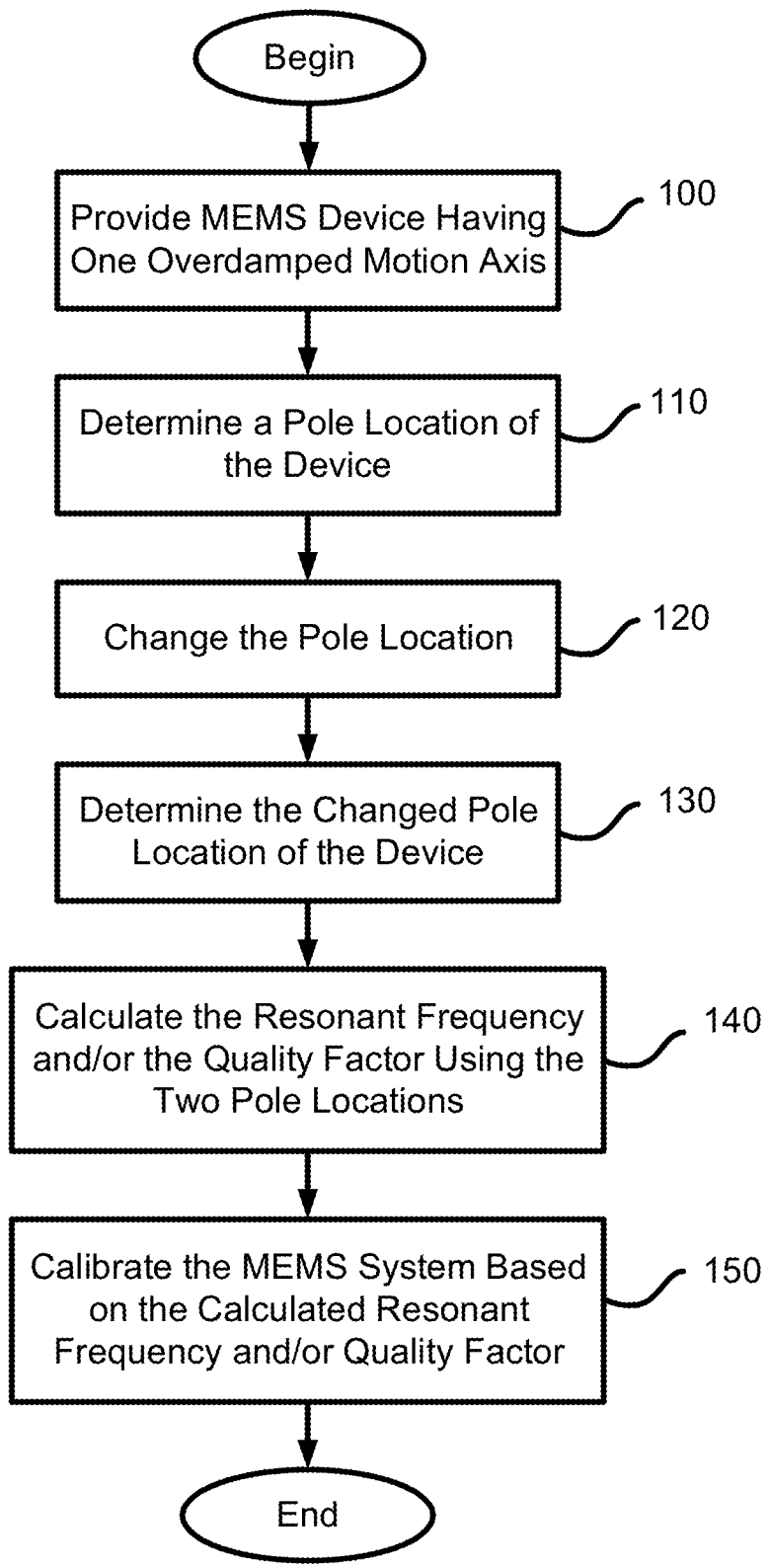
FIG. 4 shows a process of calibrating a MEMS device according to embodiments of the present invention.

FIG. 3 shows a calibration system for a MEMS system and FIG. 4 shows a process of calibrating a MEMS system. The MEMS system may include a MEMS device, such as a MEMS inertial sensor 10 as shown in FIGS. 1 and 2, and related sensor circuitry coupled with the MEMS device. The sensor circuitry may be on the same chip or die as the device itself, or on a different chip or die. For example, the circuitry may be implemented on an application specific integrated circuit (ASIC), while the MEMS device may be on a sensor chip with no circuitry (other than pads for wirebonding with the ASIC). Alternatively, the sensor circuitry may be implemented on the same chip as the MEMS device.

Figure 5:
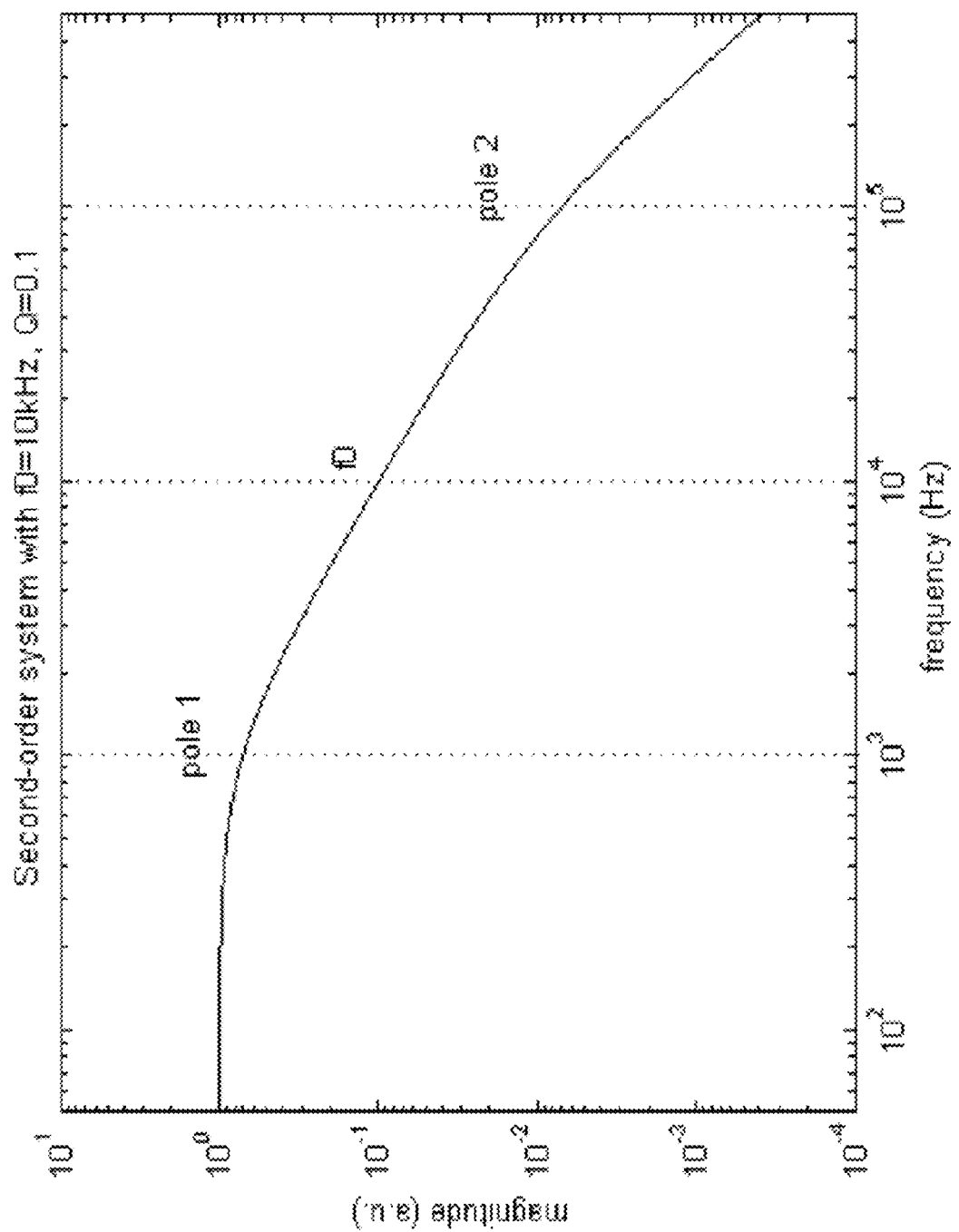
FIG. 5 is a graph of a second-order overdamped system showing the magnitude of motion relative to excitation for a resonant frequency=10 kHz and a Q=0.1.

Referring to FIG. 4, the process begins at step 100, which provides a MEMS device having at least one overdamped motion axis, e.g., the z-axis in the MEMS sensor 10 shown in FIGS. 1 and 2. For a second-order overdamped system, the system is characterized by two real poles at different frequencies. For example, FIG. 5 is a graph showing the magnitude of motion relative to excitation plotted for a resonant frequency, f0=10 kHz and a Q=0.1. The y-axis units are relatively arbitrary and irrelevant, since it is subject to circuit gains, process variations, and other uncertainties, and thus are normalized. As shown, the poles of the system are found at 1 kHz (pole 1) and at 100 kHz (pole 2). The resonant frequency, f0, is an indication of the midpoint of the poles on a logarithmic scale. The Q factor relates to the separation between the poles. Therefore, each pole is a function of both ID and Q. By identifying both poles, f0 and Q may be calculated. Traditionally, the pole frequencies are obtained by a frequency sweep, with the magnitude and/or phase of the sensor output plotted against frequency. However, in this example, the pole frequencies are two decades apart from each other, so measuring both of them would require greater than 40 dB of dynamic range and noise would make the measurement difficult for many systems.

Referring to FIGS. 3 and 4, a pole location of the MEMS device is determined by a measurement module 32 in step 110. For example, in FIG. 5, the dominant pole (i.e., the lower frequency pole or pole 1) location may be measured by the measurement module 32 using a localized frequency sweep. The measurement module 32 may subject the MEMS device to various excitation frequencies and then measure the device output at each of the frequencies in order to determine the pole location of the device. For example, the pole location may be determined by when the amplitude decreases to approximately 70% of the low frequency value, (the −3 dB point). The lower frequency pole is preferably used since it is easier to measure due to the high signal-to-noise ratio near that frequency. The measurement module 32 may also use other methods of determining the pole location, e.g., using a step response and measuring how long the device takes to react, using an impulse response and measuring how long the device takes to settle, or other similar techniques as known by those skilled in the art.

Figure 6:
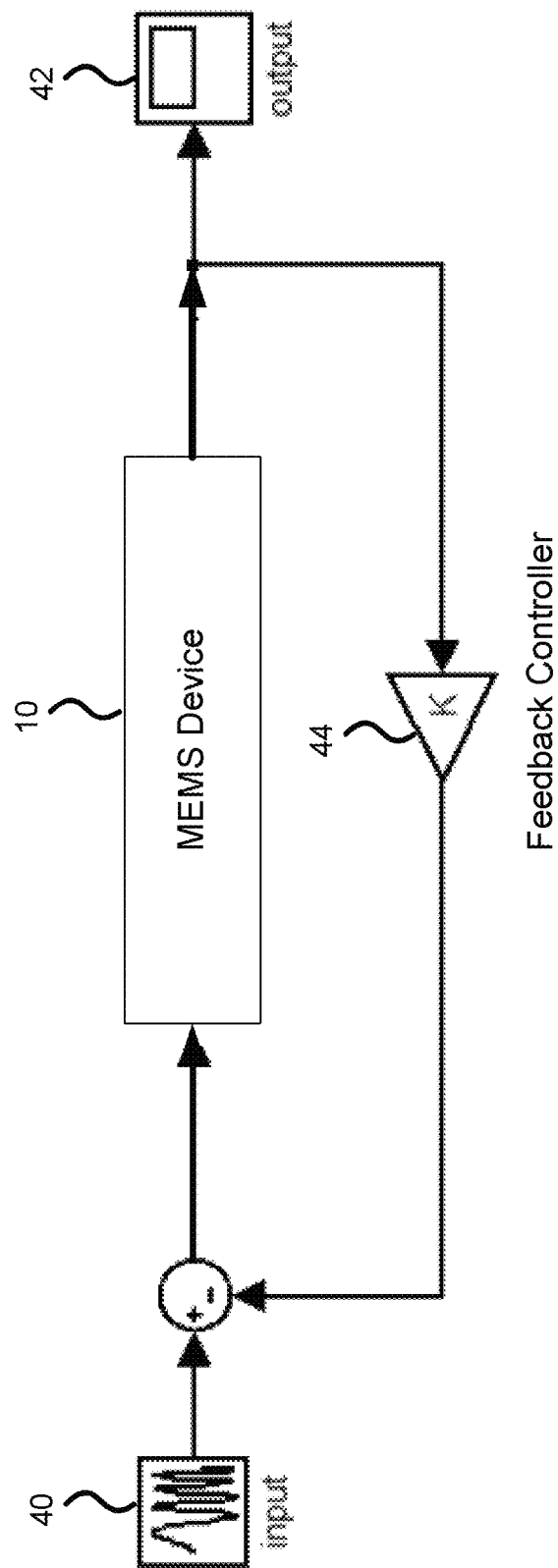
FIG. 6 schematically shows an illustrative feedback system that may be used with a MEMS device according to embodiments of the present invention.
Figure 7:
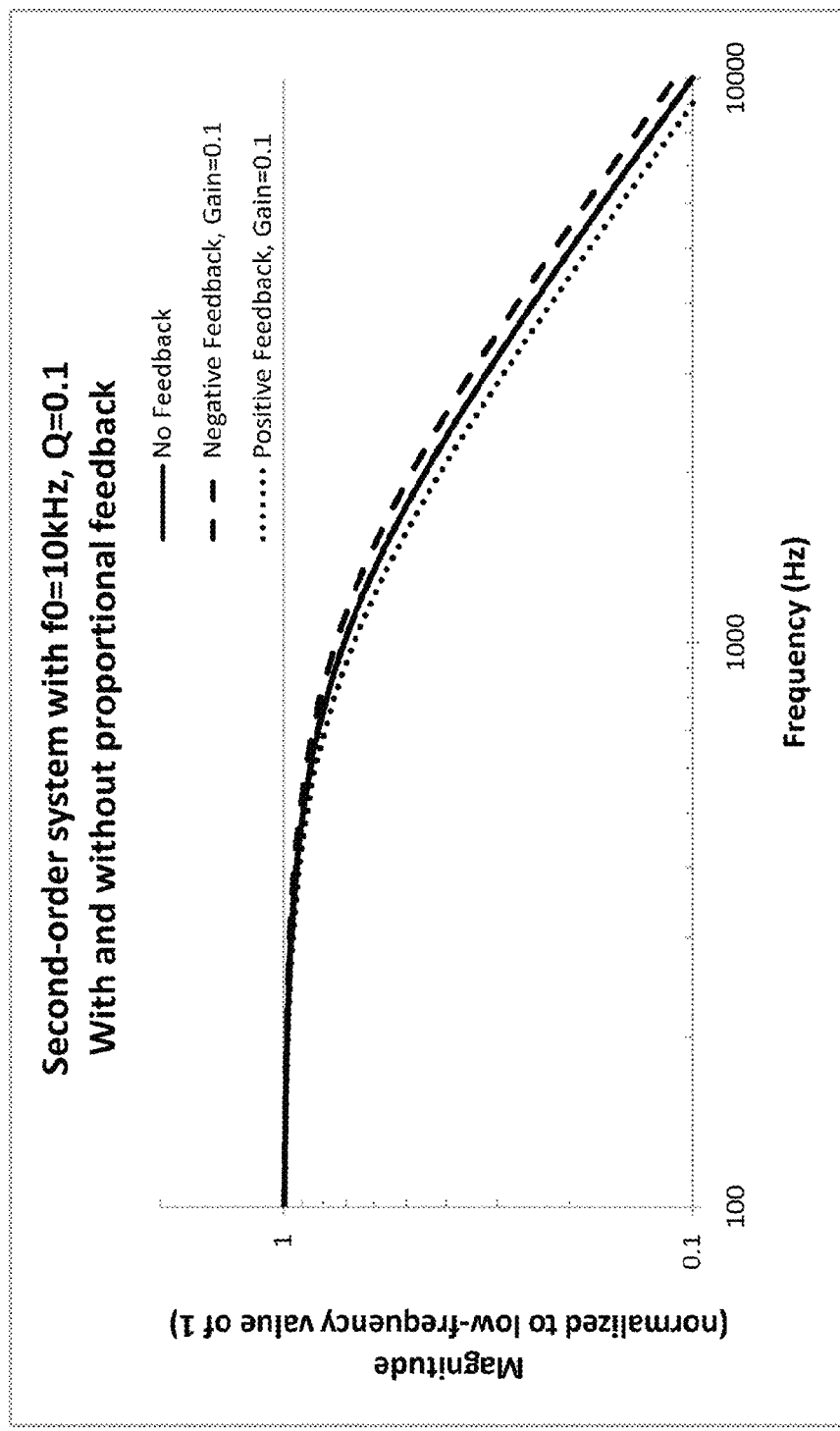
FIG. 7 is a graph of a second-order overdamped system measured with and without a feedback system according to embodiments of the present invention.

In step 120, the pole location is changed by a closed-loop feedback system 34. This may be accomplished by placing the sensor 10 in a closed-loop feedback system 34, such as shown in FIG. 6. The closed-loop feedback system 34 may supply an input 40, such as a voltage, to the MEMS sensor 10. For example, the supplied voltage drives the sensor and turns the voltage into a force, moving the movable structures relative to the non-moving structures. The motion or displacement of the movable structures is measured in the sensor by a change in capacitance, and converted to a voltage output 42. The voltage output 42 may then be amplified, filtered, or modified in some way with a feedback controller 44 and the modified voltage used as an input back to the sensor 10. The voltage output 42 from the sensor may also be displayed on an output device (not shown), such as a video display device. The term "feedback" is used herein generally, as the dynamics of the controller, positive or negative feedback, and whether position, velocity, etc. is controlled, are arbitrary. For example, as shown in FIG. 7, by using a position control system with proportional feedback the two poles may be moved closer together or further apart, depending on the sign of the feedback. Thus, the closed-loop feedback system 34 may include a positive and/or negative feedback system. The positive feedback system decreases the low frequency pole frequency while the negative feedback system increases it.

In step 130, the changed pole location of the sensor is determined by the measurement module 32. As before, the pole location may be measured by the measurement module 32 using a localized frequency sweep, or other methods as known by those skilled in the art. The dominant pole location is preferably used since it is easier to measure and only a small feedback gain is needed to shift the pole enough to measure, preserving both stability and linearity since higher-order dynamics and nonlinearities should not affect the measurement. Thus, measurement of the dominant pole with and without feedback gives two pieces of data, which can be used to subsequently calculate f0 and Q.

Although the above discussion mentions measuring an initial location of the pole first without using a feedback system and then measuring it after using a feedback system, both pole location measurements may be made after the pole location has been changed using the closed-loop feedback system 34. For instance, the initial pole location may be changed using the feedback system 34 and the first pole location may be measured by the measurement module 32 and then the pole location may be changed again and the second pole location may be measured. In this case, a negative feedback system, a positive feedback system, or both types of systems may be used for changing the two pole locations. For example, the pole locations may be changed using a negative feedback system first and then a positive feedback system, a positive feedback system first and then a negative feedback system, two positive feedback systems, or two negative feedback systems. Of course, more than two measurements may also be made.

In step 140, the resonant frequency, the Q factor, or both are calculated using the two or more measured pole locations by a computation module 36. The computation module 36 may include a processor or circuitry, e.g., implemented on a chip or device, that is configured to perform the calculations mentioned below. For example, the following analysis is based on classical feedback theory and assumes a linear system. First, a range of f0 and Q may be assumed based on the z-axis values typically found in a standard MEMS accelerometer.

$$f0 := 5 \text{ kHz} \quad \Delta f_m := 1 \text{ kHz} \quad f01 := f0 - \Delta f_m, f0 - \Delta f_m + \frac{\Delta f_m}{10} \ldots f0 + \Delta f_m \quad (1)$$

$$Q := 0.2 \quad \Delta Q_m := 0.02 \quad Q1 := Q - \Delta Q_m, Q - \Delta Q_m + \frac{\Delta Q_m}{10} \ldots Q + \Delta Q_m \quad (2)$$

Let h equal a second order response with normalized gain.

$$h(s, f0, Q) := \frac{1}{\left[\left(\frac{s}{\frac{f0}{Hz}}\right)^2 + \frac{s}{Q \cdot \frac{f0}{Hz}} + 1\right]} \quad (3)$$

Let k equal a second order response with unity gain feedback and proportional gain, excluding coincident pole-zero pairs.

$$k(s, f0, Q, \text{gain}) := \frac{\text{gain}}{\left[\left(\frac{s}{\frac{f0}{Hz}}\right)^2 + \frac{s}{Q \cdot \frac{f0}{Hz}} + 1 + \text{gain}\right]} \quad (4)$$

Solve for the two poles of h in Equation 3. There are no zeros.

$$v\_h(f0, Q) := \frac{1}{h(s, f0, Q)} \text{coeffs}, s \to \begin{pmatrix} 1 \\ \frac{1}{Q \cdot f0} \cdot Hz \\ \frac{1}{f0^2} \cdot Hz^2 \end{pmatrix} \quad (5)$$

$$\text{poles\_h}(f0, Q) := \text{polyroots}(v\_h(f0, Q))Hz$$

$$\text{poles\_h}(f0, 0.2) = \begin{pmatrix} -23.956 \\ -1.044 \end{pmatrix} kHz$$

Solve for the two unique poles of k in Equation 4 (those which are not coincident with zeros).

$$v\_k(f0, Q, \text{gain}) := \frac{1}{k(s, f0, Q, \text{gain})} \text{coeffs}, s \to \begin{pmatrix} \frac{1}{\text{gain}} + 1 \\ \frac{1}{\text{gain} \cdot Q \cdot f0} \cdot Hz \\ \frac{1}{\text{gain} \cdot f0^2} \cdot Hz^2 \end{pmatrix} \quad (6)$$

$$\text{poles\_k}(f0, Q, \text{gain}) := \text{polyroots}(v\_k(f0, Q, \text{gain}))Hz$$

$$\text{poles\_k}(f0, 0.2, -0.1) = \begin{pmatrix} -24.065 \\ -0.935 \end{pmatrix} kHz$$

Figure 8:
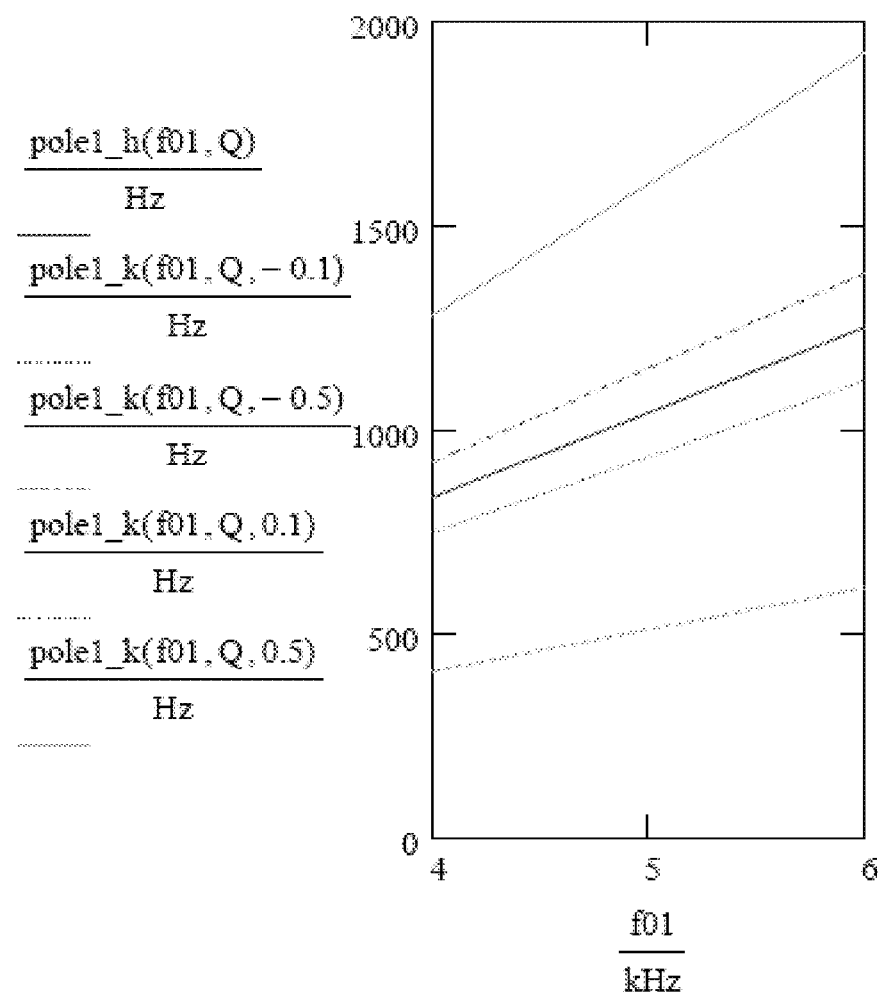
FIG. 8 shows a graph of the initial pole location, h, without feedback and various pole locations, k, as a function of resonant frequency for various gain values and a Q of 0.2.
Figure 9:
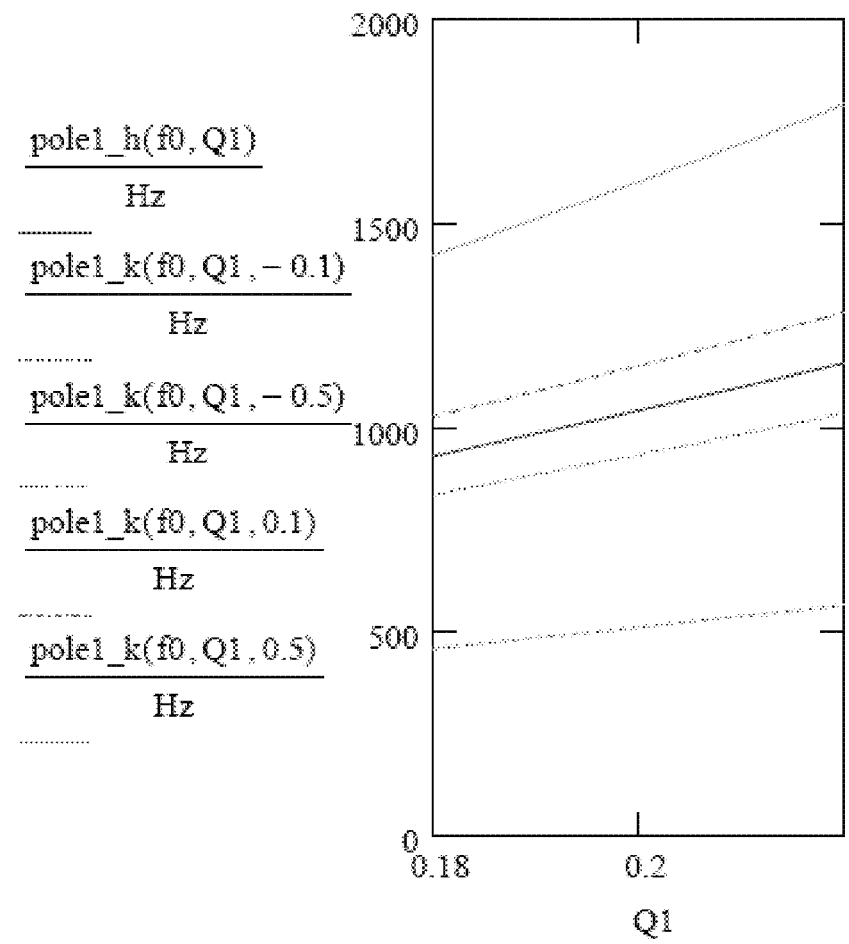
FIG. 9 shows a graph of the initial pole location, h, without feedback and various pole locations, k, as a function of Q factor for various gain values and a resonant frequency of 5 kHz.

The dominant poles locations, h (without feedback) and k (with feedback, using a −0.1 gain in the feedback system), are thus found to be:

pole1_h(f0,Q):=|max(poles_h(f0,Q))|   pole1_h(f0,0.2)= 1.044 kHz pole1_k(f0,Q,gain):=|max(poles_k(f0,Q,gain))|   pole1_k (f0,0.2,−0.1)=0.935 kHz Therefore, the pole location depends on the resonant frequency, f0, and Q factor, as well as the gain used in the feedback system 34. FIG. 8 shows a graph of the initial pole location, h, without feedback and various pole locations, k, as a function of frequency for various gains used. FIG. 9 shows a graph of the initial pole location, h, without feedback and various pole locations, k, as a function of the Q factor for various gains used.

Figure 10:
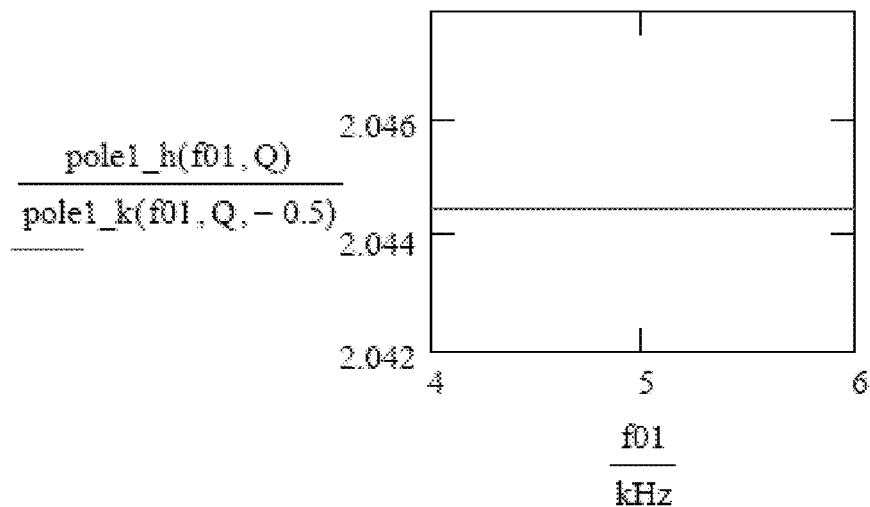
FIG. 10 shows the ratio of the pole, h, without feedback to the pole, k, with feedback (using a gain value of −0.5) as a function of resonant frequency for a Q of 0.2.
Figure 11:
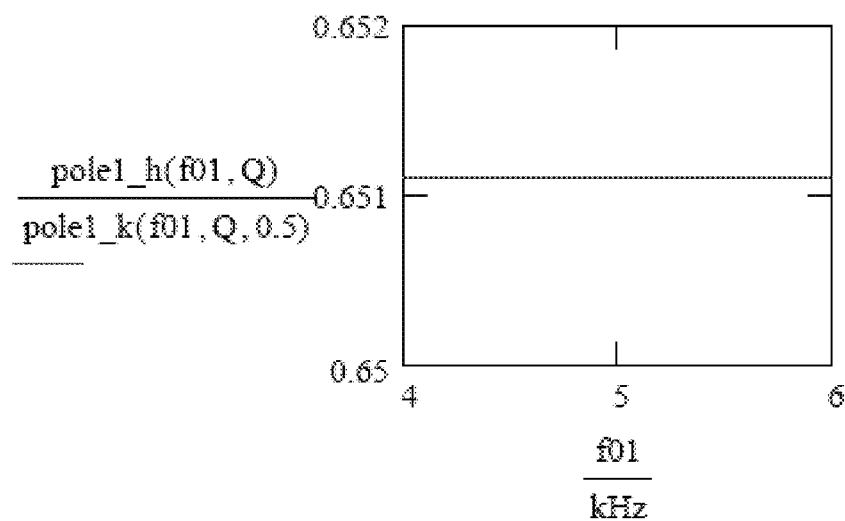
FIG. 11 shows the ratio of the pole, h, without feedback to the pole, k, with feedback (using a gain value of 0.5) as a function of resonant frequency for a Q of 0.2.

When feedback is used, the pole shift only depends on the value of the Q factor and the gain used. FIGS. 10 and 11 show the ratio of the pole, h, without feedback to the pole, k, with feedback (using a gain value of −0.5 and 0.5, respectively) as a function of frequency. As shown in FIGS. 10 and 11, the ratio of the pole with feedback to the pole without feedback is independent of f0, and depends only on Q. That is, the ratio is $$[-1/(2*Q)] \pm \left[\frac{1}{2}\right]\sqrt{(\frac{1}{Q^2} - 4*(1 + \text{gain}))} /$$

$$[-1/(2*Q)] \pm \left[\frac{1}{2}\right]\sqrt{(1/Q^2 - 4)}$$

Figure 12:
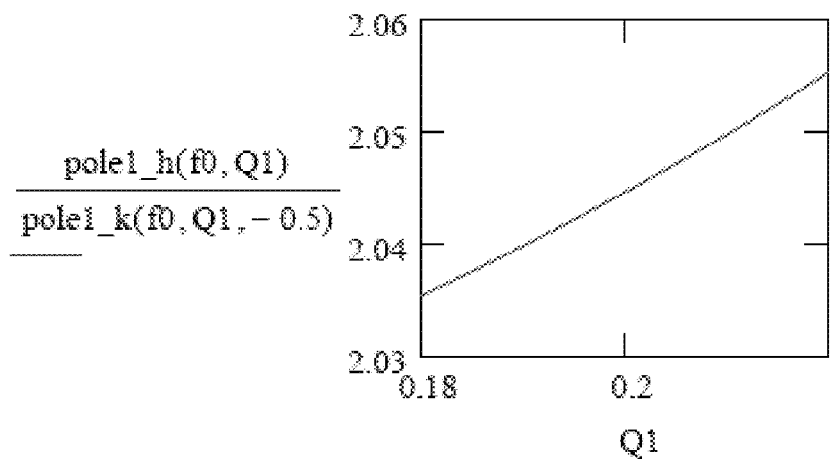
FIG. 12 shows the ratio of the pole, h, without feedback to the pole, k, with feedback (using a gain value of −0.5) as a function of Q factor for a resonant frequency of 5 kHz.
Figure 13:
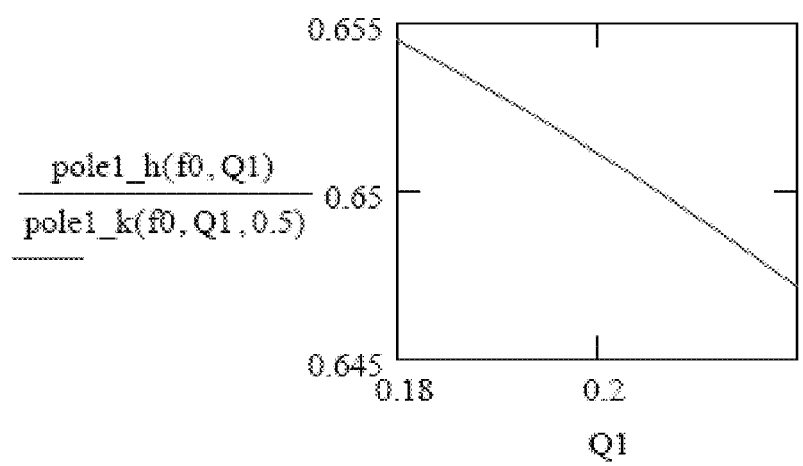
FIG. 13 shows the ratio of the pole, h, without feedback to the pole, k, with feedback (using a gain value of 0.5) as a function of Q factor for a resonant frequency of 5 kHz.
Figure 14:
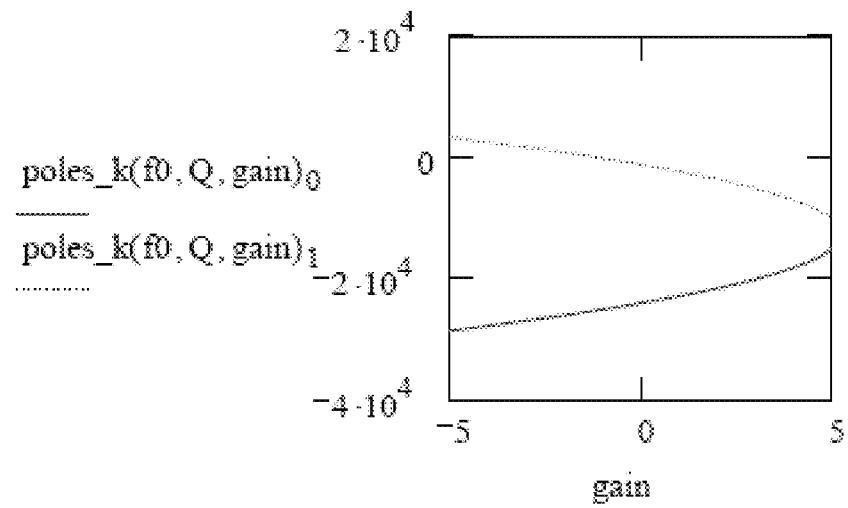
FIG. 14 shows the value of the changed pole location, k, for various gain values and for a resonant frequency of 5 kHz and Q of 0.2.
Figure 15:
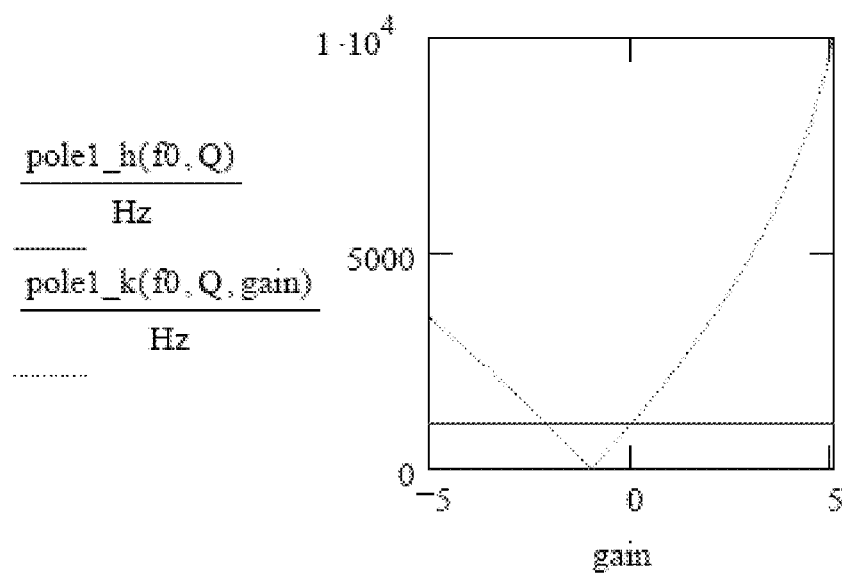
FIG. 15 shows the value of the initial pole location, h, and the value of the changed pole location, k, for various gain values and for a resonant frequency of 5 kHz and Q of 0.2.

Once the Q factor is known, the resonant frequency, f0, may be calculated by using the value of the pole location with or without feedback. FIGS. 12 and 13 show the ratio of the pole, h, without feedback to the pole, k, with feedback for two different gain values, −0.5 and 0.5 gains, respectively, as a function of Q factor. FIG. 14 shows the value of the changed pole location, k, for various gain values. FIG. 15 shows the value of the initial pole location, h, and the value of the changed pole location, k, for various gain values.

Once the resonant frequency and/or the quality factor are calculated, the MEMS system may be calibrated by a calibration module 38, in step 150, based on the calculated values. For example, the resonant frequency has a significant impact on the sensitivity of the device. As known by those skilled in the art, the sensitivity of a device may be approximated by the following equation:

$$\text{Sensitivity} = V\text{out}/a \quad (7)$$

where Vout=output voltage and a=input acceleration (sensitivity is constant for a particular device).

The resonance frequency determines the position per unit acceleration according to the formula:

$$x/a = 1/(w_0)^2 \quad (8)$$

where $w_0$ is the angular resonance frequency (2Πf0) and x=displacement. A parallel plate capacitor would have a capacitance:

$$C = eps*A/(d-x) \quad (9)$$

where eps=permittivity of air, A=capacitor area, and d=initial capacitor gap. This capacitance is then converted into an output voltage by:

$$V\text{out} = V\text{in}*C*\text{gain} \quad (10)$$

where Vin=voltage the capacitance is measured with and gain=electronic gain (e.g., including amplifiers and demodulation circuitry). Vout thus changes as capacitance changes.

Therefore, in order to get the expected value or reading from the device for a given input, the gain is typically modified to calibrate the device. As known by those skilled in the art, the gain may be modified in a number of ways, e.g., by blowing fuses, modifying resistors, or programming the memory in the related sensor circuitry. For example, sensors having related sensor circuitry on the same die may have the gain modified by laser trimming one or more resistors on the die to modify the width and/or length of the resistors. On MEMS sensors with sensor circuitry on a separate die, the electronics are more flexible and fuses may be used to modify the gain. Thus, the calibration module 38 provides instructions to calibrate the MEMS system based on the calculated resonant frequency and/or calculated quality factor. For example, if a laser is trimming one or more resistors on the sensor circuitry, then the calibration module 38 may instruct the laser on how much to trim the resistor(s) or which resistors to trim. Similarly, if the gain is being modified by programming the sensor memory, then the calibration module may encode onto the sensor circuitry, or other circuitry that may modify the sensor circuitry, a bit pattern that sets the gain on a digitally-controlled amplifier.

Although the above calculations and discussion involved a MEMS accelerometer, principles of illustrative embodiments may apply to other types of MEMS devices, such as pressure sensors, temperature sensors, viscosity sensors, and biosensors. Accordingly, discussion of accelerometers or other inertial sensors is exemplary and is not intended to limit the scope of various embodiments of the invention. In addition, although the value of Q can vary depending on the operating conditions of the sensor, such as the pressure and temperature, embodiments of the present invention involve overdamped systems having a Q<0.5, regardless of the operating parameters.

Although the above discussion involved overdamped systems having a Q <0.5, principles of illustrative embodiments may also apply to critically damped systems (Q=0.5) and underdamped systems (Q>0.5). For example, two closed-loop measurements may be used for determining the resonant frequency and quality factor of a critically damped or underdamped system. This would place the MEMS device in an overdamped state in both measurements due to the feedback, and thus have the device appear to be overdamped in at least one motion axis. Embodiments of the present invention may then be used to calculate the resonant frequency and quality factor according to the disclosed measurement technique.

Accordingly, the ability to calculate both the Q factor and the resonant frequency independently enables accurate sensitivity calibration algorithms to be derived for overdamped sensors (and critically damped or underdamped systems placed in an overdamped state). This eliminates the need of conducting a shake test on each individual device, thus greatly reducing the characterization costs associated with these types of systems. Embodiments of this measurement technique and calibration system may greatly impact accelerometers in the automotive market, where the calibration standards must be extremely accurate (e.g., 1-2%). Embodiments also allow the calibration technique to be performed on the sensors already in the final package, rather than on a characterization tool, which is what is currently done. In addition, the calibration technique may be performed on a batch of sensors in parallel, e.g., during self diagnostic tests, rather than serially on one individual sensor at a time.

Independent measurements of resonant frequency and Q factor may also enable new applications in sensing mass, viscosity, and pressure, particularly in biomedical sensors, since biological environments are water-based and result in higher damping than air. Thus, the resonant frequency and quality factor calculated according to embodiments of the present invention may be used to detect a parameter, such as pressure, temperature, viscosity, density, etc., in an overdamped system (and critically damped or underdamped systems placed in an overdamped state). In this case, the MEMS system may be calibrated using embodiments of the present invention or may be calibrated by other means. The measurement technique may then proceed according to steps 100-140 as described above.

Although the above discussion focused on using a frequency sweep at a fixed frequency or frequencies to determine the pole locations, one skilled in the art should readily appreciate that self-excitation of the sensor may be also used to determine the pole locations. In this instance, self-excitation of the sensor is measured using a feedback amplification of thermal-mechanical noise. This measurement technique also results in two frequency response measurements with measurable poles, from which both f0 and Q could be calculated. Additionally, time-domain techniques could also be employed, where the two frequency response measurements are replaced by two step response measurements, for example.

Among other implementations, the various modules discussed herein may be implemented as a single integrated unit having the discussed functionality, and/or a plurality of interconnected, separate functional devices. Reference to a "module" therefore is for convenience and not intended to limit its implementation. Moreover, the various functionalities within modules may be implemented in any number of ways, such as by means of one or more ASICs or digital signal processors, or the discussed functionality may be implemented in firmware and/or software. For example, all or part of the functionality of the calibration system 30 may be implemented in circuitry. The circuitry may be on the same chip or die as the sensor itself, or on a different chip or die. For example, the circuitry may be implemented on an ASIC and the MEMS sensor may be on a sensor chip with no circuitry. Both the ASIC and sensor chip may be within a single package, or in separate packages. Alternatively, the circuitry may be implemented on the same chip as the sensor.

Embodiments may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the method and system. Those skilled in the art should appreciate that such computer instructions may be written in a number of programming languages for use with many computer architectures or operating systems. For example, embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Thus, some embodiments of the invention may be implemented as hardware, software (e.g., a computer program product), or a combination of both software and hardware.

Although the above discussion discloses various exemplary embodiments of the invention, it should be apparent that those skilled in the art can make various modifications that will achieve some of the advantages of the invention without departing from the true scope of the invention.

What is claimed is:

1. A calibration system for a MEMS system that is overdamped along at least one motion axis, the system comprising:
   a measurement module for determining a location of a pole of a MEMS device along the at least one motion axis;
   a closed-loop feedback system configured to change a first location of the pole to a second location of the pole;
   a computation module for calculating a resonant frequency, a quality factor, or both using the first and the second location of the pole as determined by the measurement module; and
   a calibration module for calibrating the MEMS system based on the calculated resonant frequency, the calculated quality factor, or both.

2. The calibration system of claim 1, wherein the closed-loop feedback system is configured to regulate position, velocity, or both.

3. The calibration system of claim 1, wherein the closed-loop feedback system is a positive feedback system, a negative feedback system, or both.

4. The calibration system of claim 1, wherein the MEMS device is a MEMS sensor.

5. The calibration system of claim 1, wherein the MEMS sensor is an accelerometer.

6. A method of calibrating a MEMS system, the method comprising:
   providing a MEMS device that is overdamped along at least one motion axis;
   determining a first location of a pole of the MEMS device along the at least one motion axis;
   changing the first location to a second location;
   determining the second location of the pole;
   calculating a resonant frequency, a quality factor, or both using the first and the second location of the pole; and
   calibrating the MEMS system based on the calculated resonant frequency, the calculated quality factor, or both.

7. The method of claim 6, wherein the first location of the pole is determined by performing a localized frequency sweep.

8. The method of claim 6, wherein changing the first location is accomplished by a closed-loop feedback system.

9. The method of claim 8, wherein the closed-loop feedback system includes regulating position, velocity, or both.

10. The method of claim 8, wherein the closed-loop feedback system is a positive feedback system, a negative feedback system, or both.

11. The method of claim 6, wherein the MEMS device is a MEMS accelerometer.

12. The method of claim 6, further comprising changing an initial location of the pole to the first location before determining the first location of the pole.

13. The method of claim 12, wherein changing the initial location is accomplished by a closed-loop feedback system.

14. The method of claim 13, wherein changing the first location is accomplished by the closed-loop feedback system.

15. The method of claim 6, wherein the MEMS device has two poles, one having a higher frequency and one having a lower frequency, wherein the first location and the second location are determined for the lower frequency pole.

16. A method of detecting a parameter with a MEMS system, the method comprising:
   providing a MEMS device that is overdamped along at least one motion axis;
   determining a first location of a pole of the MEMS device along the at least one motion axis;
   measuring a change in the first location to a second location of the pole;
   calculating a resonant frequency, a quality factor, or both using the first and the second location of the pole; and
   determining the parameter based on the calculated resonant frequency, the calculated quality factor, or both.

17. The method of claim 16, further comprising providing a closed-loop feedback system in the MEMS system to change the first location to the second location.

18. The method of claim 17, wherein the closed-loop feedback system is a positive feedback system, a negative feedback system, or both.

19. The method of claim 16, wherein the MEMS device is a MEMS sensor.

20. The method of claim 16, further comprising changing an initial location of the pole to the first location before determining the first location of the pole.

* * * * *